March 19, 1929. J. B. DOROSKI 1,705,911
SOWING DEVICE ATTACHMENT FOR POTATO DIGGERS
Filed Aug. 12, 1927 2 Sheets-Sheet 1
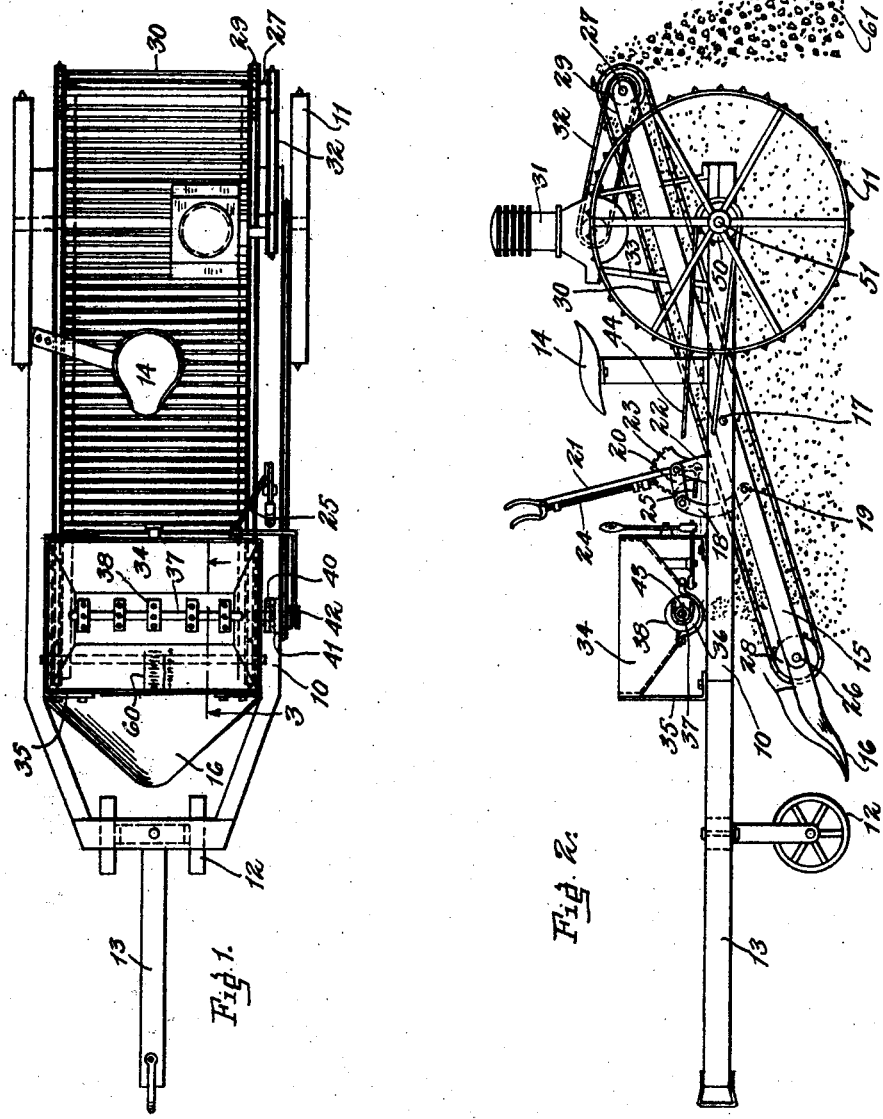

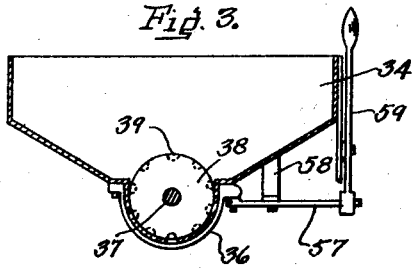
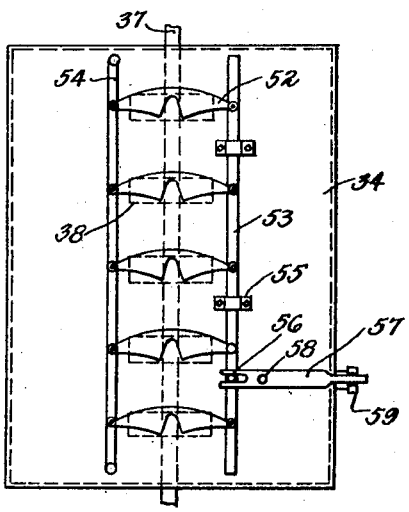
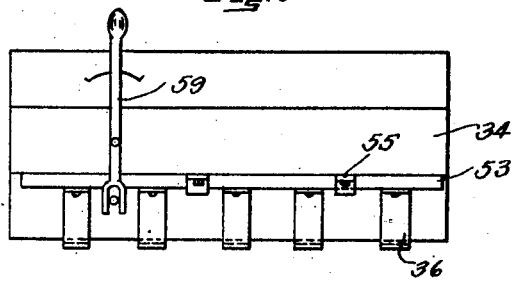

Patented Mar. 19, 1929.

1,705,911

UNITED STATES PATENT OFFICE.

JOHN B. DOROSKI, OF CALVERTON, NEW YORK.

SOWING DEVICE ATTACHMENT FOR POTATO DIGGERS.

Application filed August 12, 1927. Serial No. 212,510.

This invention relates to improvements in agricultural machines, particularly in seeders and harvesters, and more particularly to a combination potato digger and seed planter, and it is the principal object of my invention to provide such a machine for digging potatoes out of the ground, and simultaneously planting into the dug up ground, small seeds such as corn, grain, etc., covered by ground simultaneously dispensed.

Another object of my invention is the provision of a combination digging and planting machine equipped with means for transporting the dug up potatoes, etc., towards the rear of the machine.

A further object of my invention is the provision of a combination potato digging and seed planting machine in which the seed planting hopper is provided with a means for regulating the width of the seed dispensing openings and with means for stirring up these seeds which are driven from a moving part of the machine.

A still further object of my invention is the provision of a machine of this type saving time and labor and allowing the cutting out of the operation of the digging and planting operations if this is desired for moving the machine from one place of operation to another.

These and other objects and advantages of my invention will become more fully known as the description thereof proceeds, and will then be more specifically defined in the appended claims.

In the accompanying drawings, forming a material part of this disclosure:

Figure 1—is a top plan view of a combined potato digging and seed planting machine constructed according to my invention.

Figure 2—is a side elevation thereof.

Figure 3—is a sectional end view of a seed distributor, or box used with my machine, the section being taken on line 3—3 of Figure 1.

Figure 4—is a bottom plan view of the seed distributor or box.

Figure 5—is a side view of said seed distributor or box.

As illustrated on the drawing, the machine comprises the customary frame 10 on wheels 11, 12, to the front part of which the usual beam 13 for attachment of the draft animals is attached.

The frame 10 carries at a certain distance above the same a seat 14 for the operator, and below the same a potato digger 15, having an endwise arranged digging point, 16, and which is pivotally attached intermediate its ends, as at 17, to the frame. Below its pivot point a curved arm 18 is pivotally secured at its lower end, as at 19, to the side of digger 15 while its upper end has pivoted thereto one end of a link 20 pivoted at its other end to a hand lever 21, the lower end of which is movably secured to a bracket 22 having also attached thereto a toothed segment 23 while the usual spring detent 24 engages the teeth of the segment for maintaining the lever at predetermined set positions. To the pivot point of the substantially vertical lever 21 is also pivoted a substantially horizontal lever 25 serving a purpose hereinafter more fully to be described.

Cross-shafts 26, 27 on the digger frame 15 carry sprocket wheels 28, 29 respectively over which an endless conveyor 30 is guided which is operated from a motor 31 by means of a chain 32 guided over sprocket wheels on shaft 27 and on the motor shaft. The motor is supported by a suitable frame 33 on the machine frame.

At the front part of the machine frame 10 a seed distributor box 34 is supported transversely thereto in suitable brackets 35 and the box 34 is open at its top while the side walls thereof are of inwardly converging relation, the point of these mergence being of rounded contour, as at 36, and formed with seed discharge openings, the size of which can be regulated as will hereinafter be more fully described.

Suitably journaled through the box 34 directly above the bottom thereof is a rotary shaft 37 which carries a plurality of juxtaposed and spaced agitator wheels 38, having recesses 39 in the periphery for the reception of the seeds.

The shaft 37 carries a coupling member 40 adapted to be engaged by a coupling member 41 on a stub shaft 42 journaled in the machine frame which carries a sprocket wheel 43 over which a chain 44 is guided which is also guided over a sprocket wheel 50 on the rear axle 51 carrying the wheels 11.

The coupling is operated to engage its members 40, 41 or to separate the same by means of the rod 25.

The means for enlarging or for decreasing the size of the seed distributing openings comprise the member 52, of a form best illustrated in Figure 4, each of which is pivoted at one end to a slide bar 53, and at its other end to a slide bar 54, guided in suitable guides 55, at the bottom of box 34, and bar 53 carries a pin 56 engaged between the forked ends of an operating lever 57, rotatably attached intermediate its ends to a post 58 while its outer end is engaged between the forked lower end of a vertical operating lever 59 pivotally attached intermediate its ends to the side wall of the box 34.

A scale 60 is suitably arranged to indicate the size of seeds to be planted for suitably regulating the dispensing openings.

It will be clear that box 34 is filled partly with the seeds which are mixed with a suitable supply of soil.

My device operates as follows:—

While the machine is drawn forward by means of the draft animals, the motor is started to operate the conveyor for the reception of the potatoes dug up by the digger 16, which then are deposited in rear of the machine, as at 61 to be collected in suitable receptacles while the still uncovered seeds other than potatoes are covered with the loose ground or soil remaining from the digging operation.

When it is desired to plant the seeds, the coupling members 40, 41 are engaged by means of the proper operation of levers 21, 25 and the agitators will dispense the seeds and soil from box 34, after the width of the dispensing openings has been properly regulated by means of lever 59.

It is to be understood that I have disclosed a preferred form of my invention as one example only, and that such changes may be made therein as come within the scope of the appended claims without deviation from my invention.

Having thus described my invention what I claim as new and desire to secure by Letters Patent is:—

In a seed distributor for potato planters, a seed receiving and distributing box having an open bottom, a rotary shaft journalled in the end walls of said box above said open bottom, a plurality of juxtaposed and spaced agitator wheels on said shaft, each of said wheels having recesses in its periphery for the reception of the seeds, and members of a peculiar shape for enlarging and decreasing the size of the seed distributing openings, slide bars to which the ends of each of said members are secured, guides on the bottom of said box for said sliding bars, a pin on one of said bars, and a lever having a forked end adapted to engage said pin pivoted intermediate its ends to a post on the bottom of said box, and an operating lever pivotally attached intermediate its ends to the side walls of said box, and having a forked lower end engaging the end of said first named lever.

Signed at Calverton in the county of Suffolk and State of New York this 3rd day of August, A. D. 1927.

JOHN B. DOROSKI.